United States Patent
Yamazaki

(12) 
(10) Patent No.: US 10,683,036 B2
(45) Date of Patent: Jun. 16, 2020

(54) BODY MOUNT BRACKET FOR VEHICLE

(71) Applicant: TOYOTA JIDOSHA KABUSHIKI KAISHA, Toyota-shi, Aichi-ken (JP)

(72) Inventor: Taku Yamazaki, Ama-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 16/199,965

(22) Filed: Nov. 26, 2018

(65) Prior Publication Data

US 2019/0168810 A1 Jun. 6, 2019

(30) Foreign Application Priority Data

Dec. 4, 2017 (JP) ................. 2017-232864

(51) Int. Cl.
*B62D 24/02* (2006.01)
*B62D 21/09* (2006.01)

(52) U.S. Cl.
CPC ............. *B62D 24/02* (2013.01); *B62D 21/09* (2013.01)

(58) Field of Classification Search
CPC ....... B62D 24/02; B62D 21/09; B62D 33/077
USPC .............................................. 296/35.1, 35.2
See application file for complete search history.

(56) References Cited

U.S. PATENT DOCUMENTS

| | | | | |
|---|---|---|---|---|
| 4,863,214 A | * | 9/1989 | Kranis, Jr. | B62D 21/09 280/797 |
| 7,416,242 B2 | * | 8/2008 | Godfrey | B62D 25/20 296/187.08 |
| 9,073,586 B1 | * | 7/2015 | Courtright | B62D 29/008 |
| 9,139,237 B1 | * | 9/2015 | Ganti | B62D 33/077 |
| 10,343,727 B1 | * | 7/2019 | Hihara | B62D 33/02 |
| 2012/0313399 A1 | * | 12/2012 | Caliskan | B62D 25/20 296/193.01 |
| 2016/0375937 A1 | | 12/2016 | Hoke et al. | |
| 2017/0166258 A1 | | 6/2017 | Kim et al. | |

FOREIGN PATENT DOCUMENTS

DE 102016111380 A1 12/2016
JP 2007-283999 A 11/2007

\* cited by examiner

*Primary Examiner* — Jason S Morrow
(74) *Attorney, Agent, or Firm* — Oliff PLC

(57) ABSTRACT

A body mount bracket that is joined to a body mount fixed to a frame is provided at a bottom of a body. The body mount bracket has: a boss that is penetrated by a body fastening bolt of the body mount; and a longitudinal rib that extends from the boss in a longitudinal direction of the body mount bracket. The longitudinal rib is provided with a notch near the boss. When receiving a collision load, the body mount bracket is fractured at a position of the notch.

2 Claims, 3 Drawing Sheets

BODY MOUNT BRACKET FOR VEHICLE

CROSS REFERENCE TO RELATED APPLICATION

The disclosure of Japanese Patent Application No. 2017-232864 filed on Dec. 4, 2017 including the specification, claims, drawings, and abstract is incorporated herein by reference in its entirety.

TECHNICAL FIELD

The present disclosure relates to a body mount bracket that is provided at a bottom of a body mounted on a frame and cooperates with a body mount on the frame to join the frame and the body.

BACKGROUND

A vehicle having a separate structure in which a body is mounted on a frame has been known. In this vehicle body structure, typically, a body mount that includes a resilient body such as one made of rubber is arranged at a plurality of positions on the frame, and the body is mounted on the frame via these body mounts. Members (for example, body mount brackets) that are joined to the body mounts are provided in the body; particularly, at a bottom thereof.

In PATENT DOCUMENT 1 described below, a left outrigger (23) and a right outrigger (24) are provided on a vehicle floor so as to extend a second floor cross member (22) laterally. Each of the left and right outriggers (23, 24) is provided with first and second fragile portions (173, 176), each of which is formed as a dent or a recess. During a lateral collision, a collision load is applied to each of the left and right outriggers (23, 24) in a manner to compress the left and right outriggers (23, 24) in a longitudinal direction. When receiving the compressive load, each of the left and right outriggers (23, 24) is deformed and crushed in a load application direction with the first and second fragile portions (173, 176) being origins, and thereby absorbs the collision load. Note that the above reference signs in parentheses are used in PATENT DOCUMENT 1 described below and are unrelated to the reference signs used in DESCRIPTION OF EMBODIMENTS in the present disclosure.

CITATION LIST

PATENT DOCUMENT 1: JP 2007-283999 A

SUMMARY

Technical Problem

For the vehicle having the separate structure, a technique of suppressing transmission of the collision load, which is received by the frame, to the body has been requested. PATENT DOCUMENT 1 discloses a technique of absorbing collision energy, in which the collision energy that is received by the body is absorbed by partial deformation of the body during the lateral collision. However, the suppression of the transmission of the collision load from the frame to the body is not described therein.

The present disclosure has a purpose of suppressing transmission, to a body of a vehicle having a separate structure, of a collision load that is received by a frame.

Solution to Problem

The present disclosure relates to a body mount bracket that is provided at a bottom of a body mounted on a frame and cooperates with a body mount on the frame to join the frame and the body. The body mount bracket of the present disclosure is an aluminum alloy cast, and a longitudinal direction thereof corresponds to a vehicle width direction. In addition, the body mount bracket of the present disclosure has: a boss that is provided at an outer end in the vehicle width direction and is penetrated by a body fastening bolt of the body mount; and a longitudinal rib that extends inward in a vehicle from the boss and is provided with a notch near the boss.

The body mount bracket is the aluminum alloy cast and is easily fractured. In the case where the body mount bracket receives a collision load from the front via the frame and the body mount, the body mount bracket is fractured at a cross section that passes the notch provided in the longitudinal rib.

Furthermore, the body mount bracket of the present disclosure has a recess that extends longitudinally on an upper surface. Ribs are formed at a bottom of the recess, thereby securing required strength and rigidity. The boss is provided at the bottom of the recess, and radial ribs that extend radially from the boss are provided as parts of the ribs formed in the recess. The longitudinal rib is also a part of the ribs formed at the bottom of the recess. Furthermore, the recess is provided with a lateral rib that crosses the longitudinal rib.

Advantageous Effects of Invention

When the body mount bracket is fractured, a collision load that is received by the body from the frame can be suppressed.

BRIEF DESCRIPTION OF DRAWINGS

Embodiment(s) of the present disclosure will be described by reference to the following figures, wherein.

DESCRIPTION OF EMBODIMENTS

Figure 1:
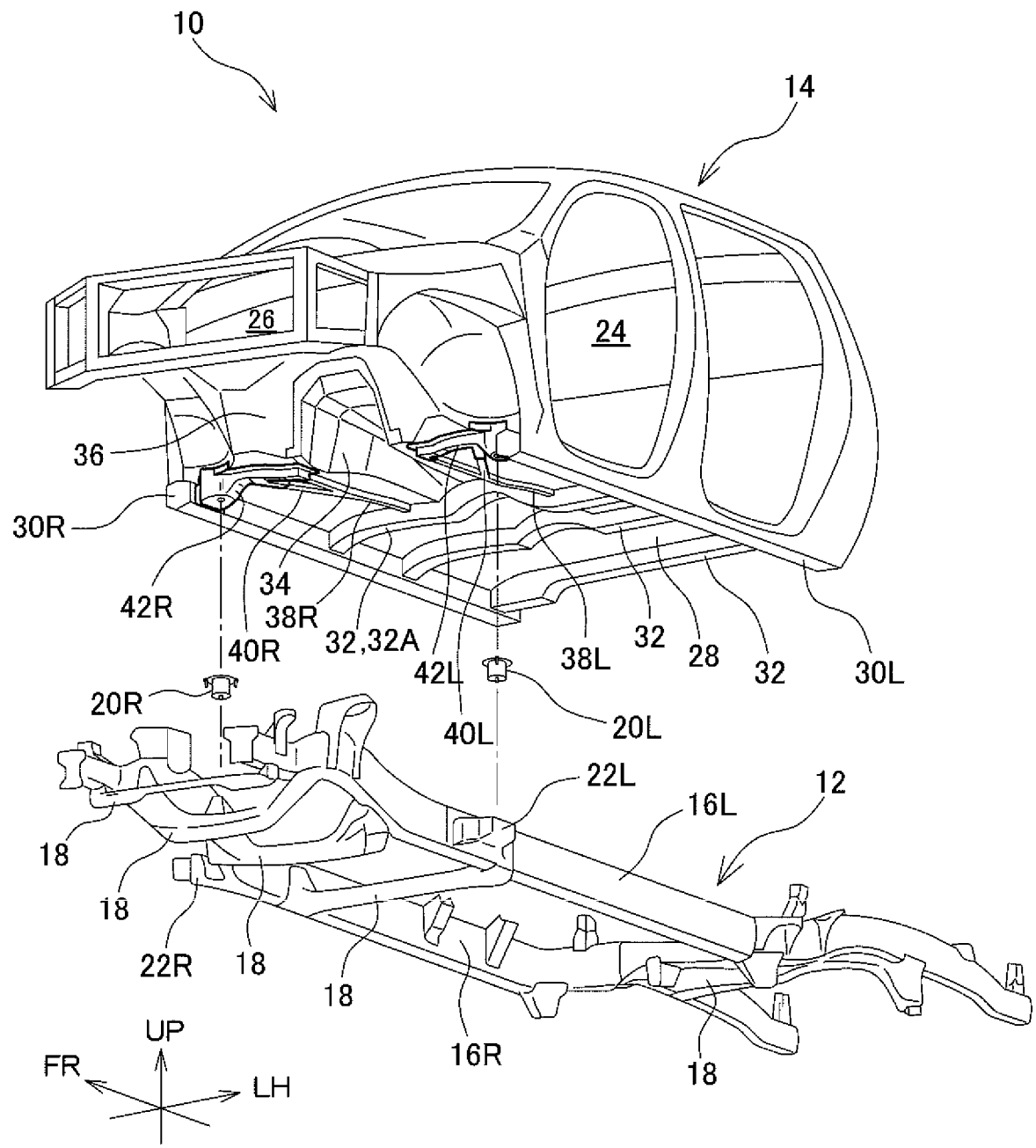
FIG. 1 is an exploded perspective view of a body and a frame of a vehicle.

A description will hereinafter be made on an embodiment of the present disclosure in accordance with the drawings. FIG. 1 is a view of a state where a frame 12 and a body 14 of a vehicle 10 having a separate structure are separated and seen obliquely from below. In FIG. 1 and the following drawings, a direction indicated by an arrow FR is a front direction of the vehicle, a direction indicated by an arrow LH is a left direction of the vehicle, and a direction indicated by an arrow UP is an upward direction of the vehicle. In the following description, unless otherwise specified, the terms expressing the directions and orientations, such as front (forward), rear (rearward), left (leftward), right (rightward), upper (upward), and lower (downward), for example, refer to the directions and orientations with respect to a vehicle.

The frame 12 has: two side rails 16L, 16R that extend in a vehicle longitudinal direction on left and right sides of the vehicle 10; and a plurality of frame cross members 18, each of which extends in a lateral direction of the vehicle and connects the side rails 16L, 16R. In the case where it is not necessary to distinguish the left and right side rails 16L, 16R from each other, the symbols "L" and "R" will be omitted, and the left and right side rails 16L, 16R will simply be described as the side rails 16. Similarly, with regard to bilaterally-paired members and parts other than the side rails 16, the symbols "L" and "R" will hereinafter be included in the reference signs when the left and right members and parts are distinguished. In the case where it is not necessary to distinguish the left and right members and parts, the symbols "L" and "R" will hereinafter be omitted, and only the numerals will be described.

Mount support bases 22L, 22R in which body mounts 20L, 20R are arranged are provided on the side rails 16L, 16R. The body mounts 20 and the mount support bases 22 are provided at a plurality of positions in the longitudinal direction. However, FIG. 1 only illustrates the body mounts 20 and the mount support bases 22 that are provided at positions corresponding to a front edge of a vehicle cabin 24.

The body 14 defines the vehicle cabin 24 that is a space accommodating occupants. The body 14 further defines an engine compartment 26 that accommodates an engine. The body 14 may include a luggage compartment behind the vehicle cabin 24. The body 14 has a floor panel 28 that constitutes a floor surface of the vehicle cabin 24. Rockers 30L, 30R, each of which extends longitudinally and has a closed cross-sectional structure, are arranged on left and right sides of the floor panel 28. A plurality of floor cross members 32, each of which extends in a manner to connect the left and right rockers 30L, 30R, are provided on a lower surface of the floor panel 28. Each of the floor cross members 32 defines a closed cross-sectional structure with the floor panel 28. For example, each of the floor cross members 32 has a hat-like cross-sectional shape, and a portion corresponding to a brim of the hat is welded to the floor panel 28. In this way, the closed cross-sectional structure is defined.

A floor panel reinforcement 34 is provided at a center of a front portion of the floor panel 28, and the floor panel reinforcement 34 is raised upward and forms a tunnel underneath. The floor panel reinforcement 34 extends from a dashboard 36 that partitions the vehicle cabin 24 and the engine compartment 26 to a floor cross member 32A that is arranged at the foremost position of the floor cross members 32. Tunnel-side reinforcements 38L, 38R, each of which extends along an edge of an opening under the floor panel reinforcement 34, are provided on the lower surface of the floor panel 28. The tunnel-side reinforcements 38 define the closed cross-sectional structure with the floor panel 28. For example, the tunnel-side reinforcements 38 have a hat-like cross-sectional shape, and portions corresponding to the brim of the hat are welded to the floor panel 28. In this way, the closed cross-sectional structure is defined. Each of the tunnel-side reinforcements 38L, 38R extends from a front edge of the floor panel 28 to the floor cross member 32A. Furthermore, branch reinforcements 40L, 40R are provided on the lower surface of the floor panel 28. The branch reinforcements 40L, 40R are branched from intermediate points of the tunnel-side reinforcements 38L, 38R and extend forward and outward in a vehicle width direction. The branch reinforcements 40L, 40R also define the closed cross-sectional structure with the floor panel 28. For example, the branch reinforcements 40L, 40R have a hat-like cross-sectional shape, and portions corresponding to the brim of the hat are welded to the floor panel 28. In this way, the closed cross-sectional structure is defined.

Body mount brackets 42L, 42R are arranged in a manner to extend laterally at the front edge of the floor panel 28, particularly between the floor panel reinforcement 34 and the left and right rockers 30L, 30R. Each of the body mount brackets 42 is joined to the floor panel 28. The body mount brackets 42 are joined to the body mounts 20, and the frame 12 and the body 14 are joined to each other via the body mounts 20. Each of the body mounts 20 includes a resilient element such as one formed from rubber and suppresses transmission of vibrations between the frame 12 and the body 14. The same applies to the other body mounts, which are not illustrated.

Figure 2:
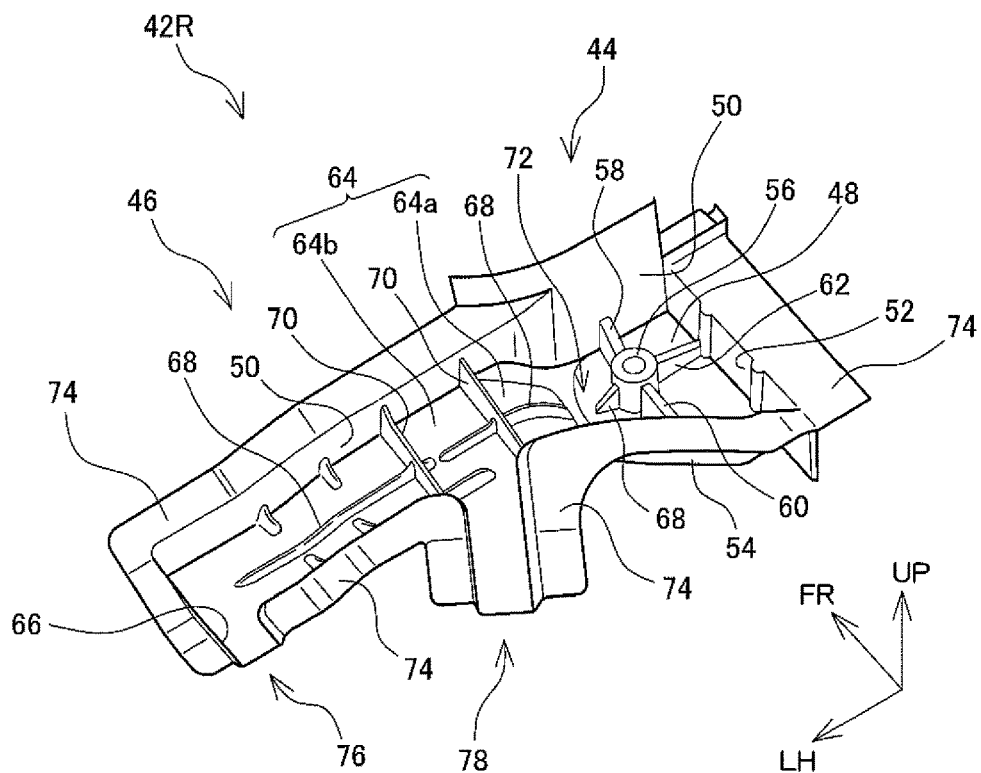
FIG. 2 is a perspective view of a body mount bracket.
Figure 3:
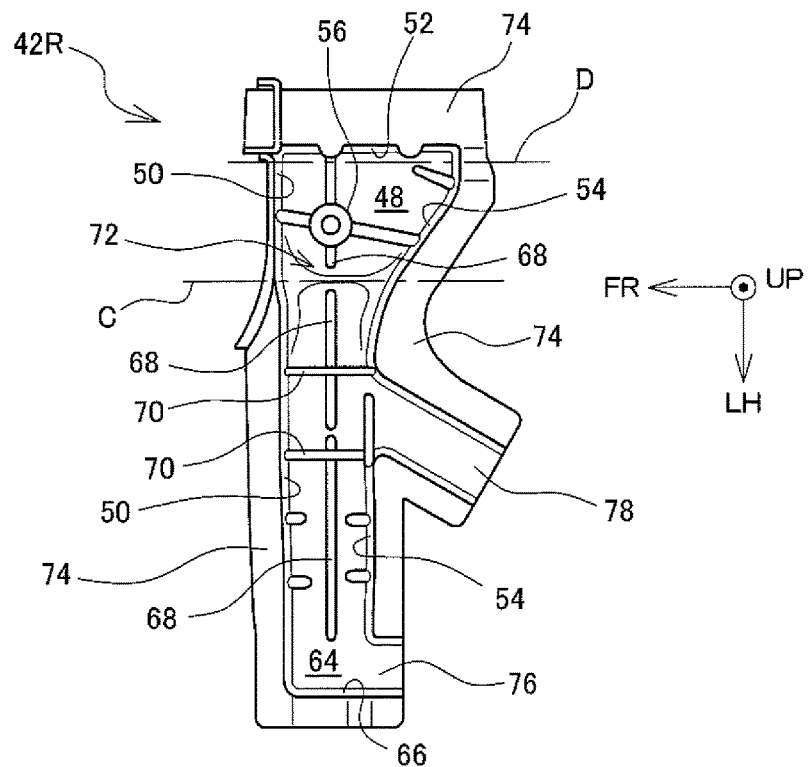
FIG. 3 is a plan view of the body mount bracket.
Figure 4:
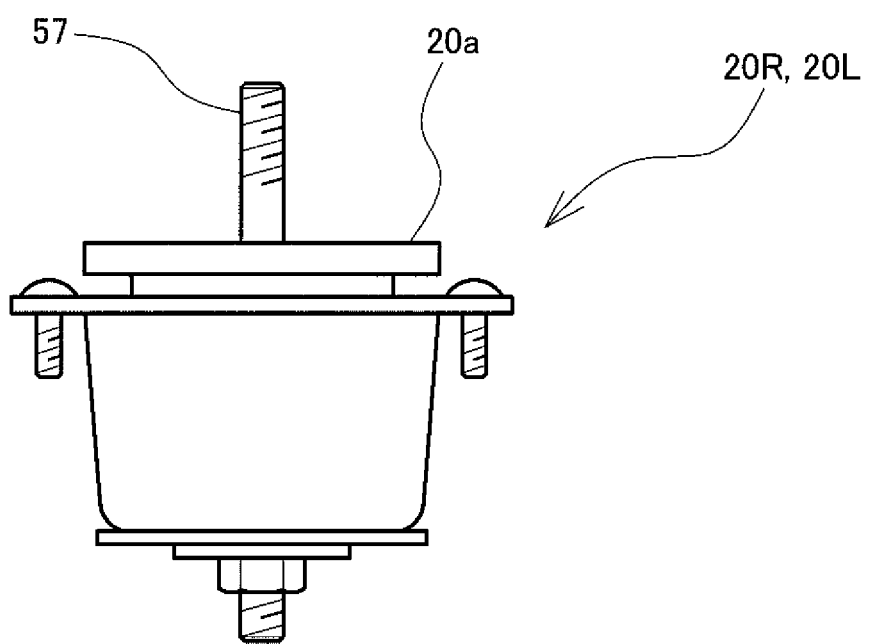
FIG. 4 is a side view of the body mount bracket.

FIG. 2 and FIG. 3 are views of the body mount bracket 42R on the right side of the vehicle. FIG. 2 is a perspective view thereof, and FIG. 3 is a plan view thereof. Similar to FIG. 1, arrows FR, LH, UP in FIG. 2 and FIG. 3 respectively indicate the front direction, the right direction, and the upward direction of the vehicle. The body mount bracket 42L on the left side has a bilaterally symmetrical shape to the body mount bracket 42R on the right side, and thus the description thereon will not be made. FIG. 4 is a side view of the body mounts 20L, 20R.

The body mount bracket 42 can be an aluminum alloy cast and particularly one made by aluminum alloy die-casting. The lateral direction of the vehicle; that is, the vehicle width direction, substantially corresponds to a longitudinal direction of the body mount bracket 42. The body mount bracket 42 has a mount joined section 44 at an outer end in the vehicle width direction, and the mount joined section 44 is joined to the body mount 20. Furthermore, the body mount bracket 42 has an inward extension section 46 that extends inward in the vehicle width direction from the mount joined section 44.

The mount joined section 44 has a joined section bottom plate 48 whose lower surface is tightly fitted to an upper surface 20a of the body mount 20 (see FIG. 4). The joined section bottom plate 48 is surrounded by a front wall 50, a right wall 52, and a rear wall 54 from three directions, and has a substantially columnar boss 56 at a center thereof. The boss 56 is raised upward. Since the joined section bottom plate 48 is surrounded by the front wall 50, the right wall 52, and the rear wall 54, the mount joined section 44 is formed such that an upper surface thereof is recessed, and the boss 56 is provided at a bottom of the recess. A through hole is provided along a center line at a center of the boss 56, and a body fastening bolt 57 (see FIG. 4) that is provided in the body mount 20 penetrates the through hole. A nut is screwed to the body fastening bolt 57, which has penetrated the through hole, and is then fastened. In this way, the body mount bracket 42 and the body mount 20 are joined.

The mount joined section 44 is provided with a plurality of radial ribs 58, 60, 62, each of which extends radially from the boss 56. These radial ribs 58, 60, 62 respectively extend to the front wall 50, the rear wall 54, and the right wall 52 and connect the joined section bottom plate 48 and the corresponding peripheral walls 50, 52, 54 to the boss 56, so as to increase rigidity and strength of the mount joined section 44.

The inward extension section 46 has an extension section bottom plate 64, and the extension section bottom plate 64 is surrounded by the above-described front wall 50, the above-described rear wall 54, and a left wall 66. Since the extension section bottom plate 64 is surrounded by the front wall 50, the rear wall 54, and the left wall 66, an upper surface of the inward extension section 46 is formed to be recessed. The recesses that are formed on the upper surfaces of the mount joined section 44 and the inward extension section 46 continue and have a trough shape that extends laterally. The extension section bottom plate 64 has: a slant surface 64a that is adjacent to the joined section bottom plate 48; and a substantially flat shelf surface 64b. The shelf surface 64b and the joined section bottom plate 48 are located on different levels. A longitudinal rib 68 that extends inward in the vehicle width direction from the boss 56 is vertically provided in the joined section bottom plate 48 and the extension section bottom plate 64. The longitudinal rib 68 increases flexural rigidity and flexural strength of the body mount bracket 42 in the longitudinal direction. The longitudinal rib 68 is one of the radial ribs that extend radially from the boss 56. Furthermore, the inward extension section 46 is provided with one or a plurality of lateral ribs 70 in a manner to cross the longitudinal rib 68.

In the longitudinal rib 68, a notch 72 is formed at a position near the boss 56. In the body mount bracket 42, the notch 72 is provided on a boundary between the joined section bottom plate 48 and the extension section bottom plate 64 (particularly, the slant surface 64*a* thereof). The depth of the notch 72 may be equal to height of the longitudinal rib 68. In this case, the longitudinal rib 68 is divided at the position of the notch 72. In addition, the depth of the notch 72 may be less than the height of the longitudinal rib 68. In this case, the longitudinal rib 68 continues while the height thereof at the position of the notch 72 becomes lower than the height of the other portions thereof.

A flange 74 is provided at a peripheral edge of the body mount bracket 42. In a cross section that is orthogonal to the longitudinal direction, the inward extension section 46 has a hat-like cross-sectional shape that is defined by the extension section bottom plate 64, the front wall 50, the rear wall 54, and the flange 74. The flange 74 of the body mount bracket 42 is joined to the floor panel 28. As described above, the body mount bracket 42 is made from aluminum alloy. Thus, in the case where the floor panel 28 is made of a steel plate, the body mount bracket 42 and the floor panel 28 are joined by a method such as riveting capable of joining different types of metal.

A tunnel-side reinforcement joined section 76 is provided at an inner end of the inward extension section 46 in the vehicle width direction. The tunnel-side reinforcement joined section 76 also has a hat-like cross section, and a recess on an upper surface thereof extends to the rear of the vehicle. The tunnel-side reinforcement 38 is received by the recess of the joined section 76 and is joined to the body mount bracket 42 at this position. Furthermore, a branch reinforcement joined section 78 is provided at an intermediate position of the inward extension section 46 in the longitudinal direction. The branch reinforcement joined section 78 also has a hat-like cross section, and a recess on an upper surface thereof extends obliquely to the rear of the vehicle and inward in the vehicle width direction. The branch reinforcement 40 is received by the recess of the joined section 78 and is joined to the body mount bracket 42 at this position.

Each of the body mount brackets 42 is joined to the floor panel 28, the tunnel-side reinforcement 38, and the branch reinforcement 40 and thereby functions as a reinforcement at the front edge of the floor panel 28.

In the case of a collision against a forward obstacle, when there is a difference between a collision load of the frame 12 and a collision load of the body 14, significant stress is generated on a boundary therebetween; that is, the body mounts 20 and peripheral portions thereof. In particular, in the case where a collision target unevenly collides with a left portion or a right portion of the vehicle in the vehicle width direction as in an offset frontal collision or a small overlap collision, one of the side rails 16 of the frame 12 receives the large collision load. Meanwhile, the collision target partially collides with a front portion of the body 14. Thus, while the collision load is concentrated on the directly collided portion and causes significant deformation of the directly collided portion, the entire body 14 attempts to move forward by inertia. As a result, behavior of the frame 12 significantly differs from behavior of the body 14, and the body mounts 20 and the peripheral portions thereof are significantly deformed due to the collision load received by the frame 12. The positions of the body mounts 20 are close to the dashboard 36, and thus the collision load from each of the body mounts 20 possibly causes significant deformation of the dashboard 36 and a peripheral portion thereof.

In order to suppress the excessive collision load that is received from each of the body mounts 20, the above-described notch 72 is provided in the longitudinal rib 68 of each of the body mount brackets 42. In the case where relative movement between the frame 12 and the body 14 is increased during the collision, the significant stress is generated around each of the body mounts 20. Consequently, the significant stress is also generated on each of the body mount brackets 42. As described above, each of the body mount brackets 42 is the aluminum alloy cast and is more likely to be fractured than the steel plate or the like. In particular, in each of the body mount brackets 42, the notch 72 is provided in the longitudinal rib 68. Thus, during the frontal collision, each of the body mount brackets 42 is fractured at a position that passes the notch 72 (indicated by line C in FIG. 3). Furthermore, each of the body mount brackets 42 is also fractured at a position of line D that is on an opposite side of the boss 56 from the side where the notch 72 is provided. Due to these fractures, the body 14 is detached from the frame 12 at positions of the body mount brackets 42. In this way, at these positions, the body 14 is prevented from receiving the collision load from the frame 12. Thus, the deformation of the body 14 can be suppressed.

REFERENCE SIGNS LIST

10: Vehicle
12: Frame
14: Body
16: Side rail
18: Frame cross member
20: Body mount
22: Mount support base
24: Vehicle cabin
26: Engine room
28: Floor panel
30: Rocker
32: Floor cross member
34: Floor panel reinforcement
36: Dashboard
38: Tunnel-side reinforcement
40: Branch reinforcement
42: Body mount bracket
44: Mount joined section
46: Inward extension section
48: Joined section bottom plate
50: Front wall
52: Right wall
54: Rear wall
56: Boss
57: Body fastening bolt
58, 60, 62: Radial rib
64: Extension section bottom plate
66: Left wall
68: Longitudinal rib
70: Lateral rib
72: Notch
74: Flange 76: Tunnel-side reinforcement joined section
78: Branch reinforcement joined section

The invention claimed is:

1. A body mount bracket that is provided at a bottom of a body mounted on a frame and cooperates with a body mount on the frame to join the frame and the body, wherein
 the body mount bracket is an aluminum alloy cast, and a longitudinal direction thereof corresponds to a vehicle width direction, and
 the body mount bracket has:
  a boss that is provided at an outer end in the vehicle width direction and is penetrated by a body fastening bolt of the body mount; and
  a longitudinal rib that extends inward in the vehicle width direction from the boss and is provided with a notch near the boss.

2. The body mount bracket according to claim 1, wherein
 the body mount bracket has a recess that extends longitudinally on an upper surface,
 the boss is provided at a bottom of the recess, and the recess is formed with plural radial ribs that are provided in a manner to extend radially from the boss, and
 the longitudinal rib is provided at the bottom of the recess, and the recess is provided with a lateral rib in a manner to cross the longitudinal rib.

* * * * *